Figure 1:
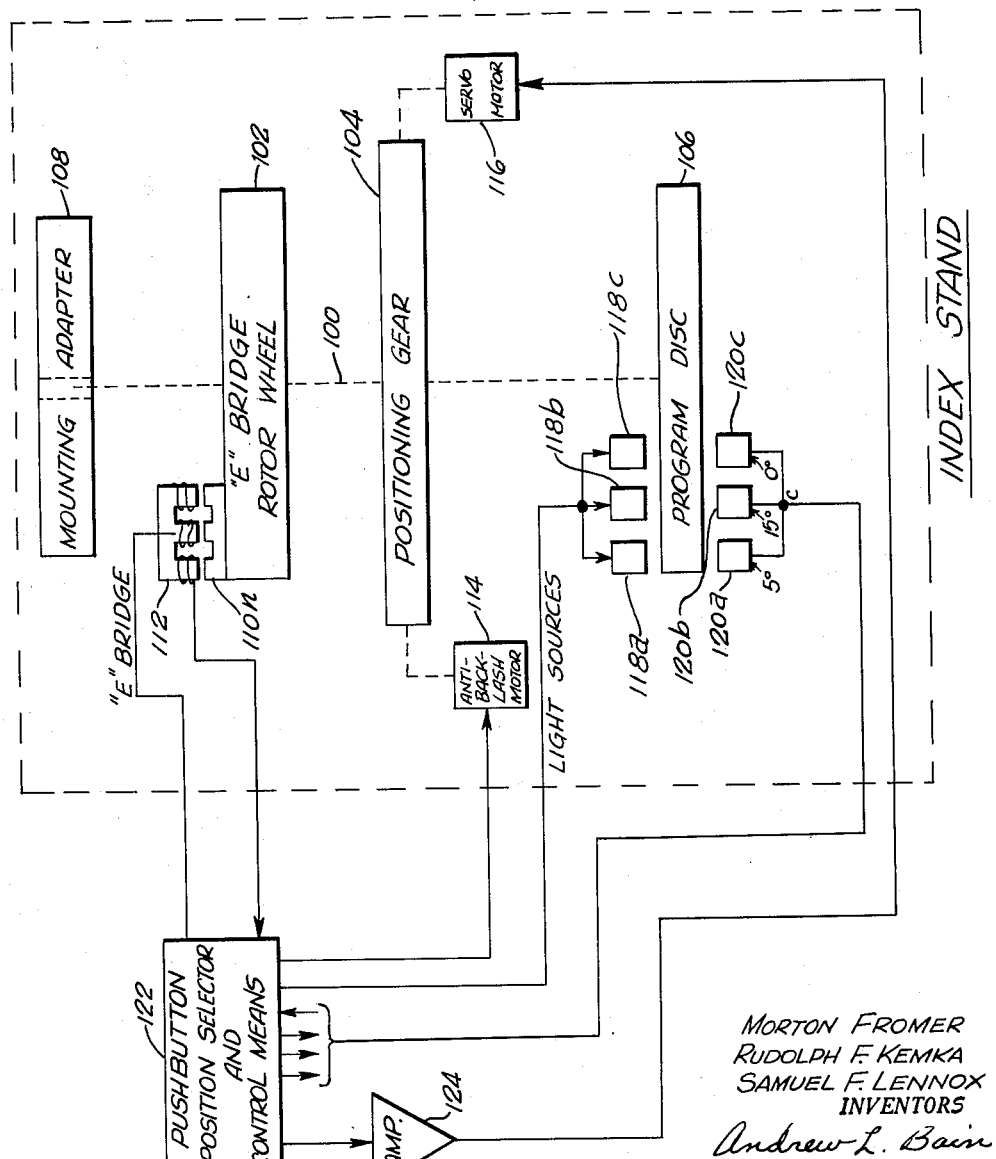

MORTON FROMER
RUDOLPH F. KEMKA
SAMUEL F. LENNOX
INVENTORS

ATTORNEYS

Oct. 24, 1961  M. FROMER ET AL  3,005,939
PRECISION ANGULAR INDEXING SERVOSYSTEM
Filed Dec. 8, 1959  5 Sheets-Sheet 2

MORTON FROMER
RUDOLPH F. KEMKA
SAMUEL F. LENNOX
    INVENTORS

BY Andrew L. Bain

ATTORNEYS

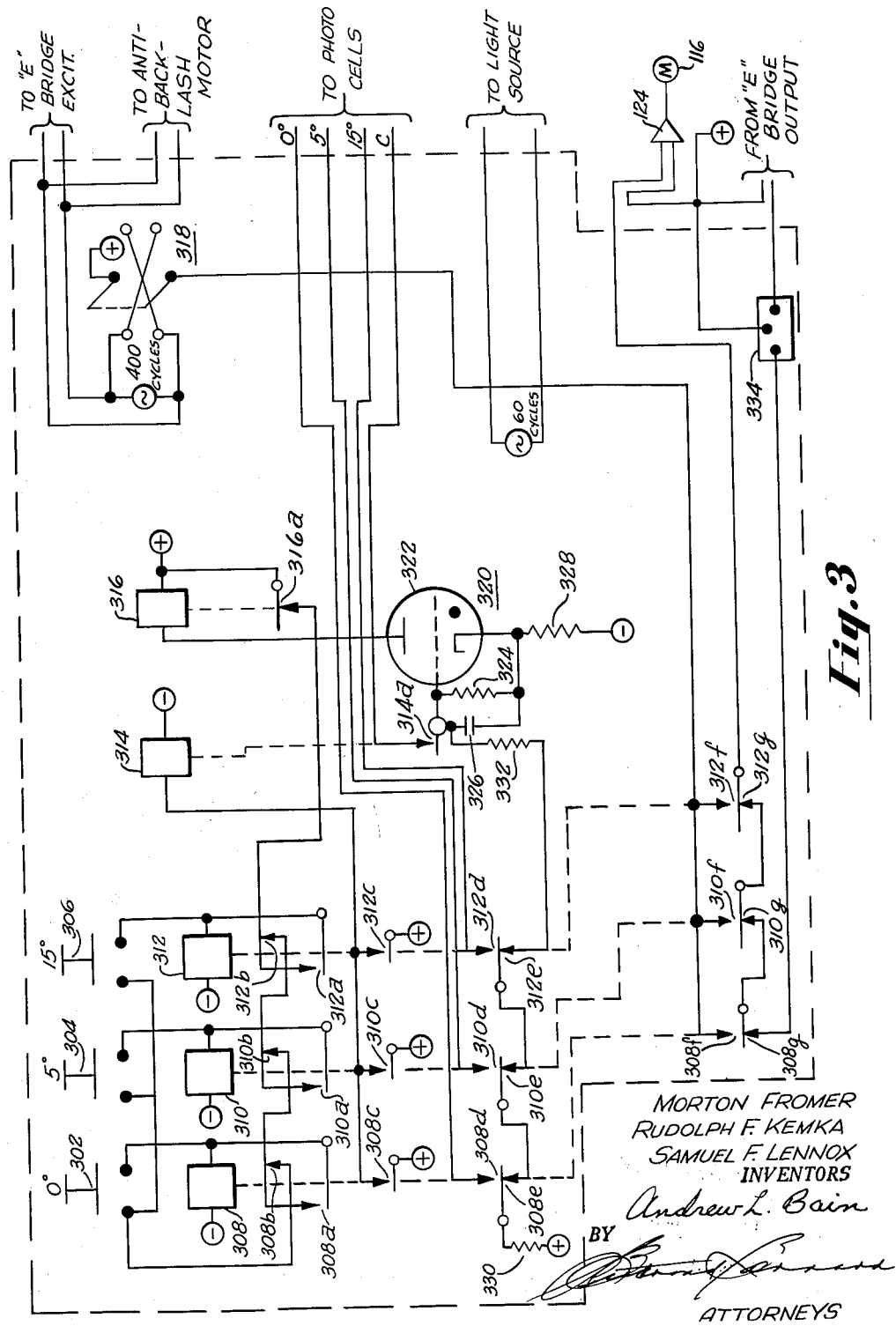

Oct. 24, 1961 M. FROMER ET AL 3,005,939
PRECISION ANGULAR INDEXING SERVOSYSTEM
Filed Dec. 8, 1959 5 Sheets-Sheet 4
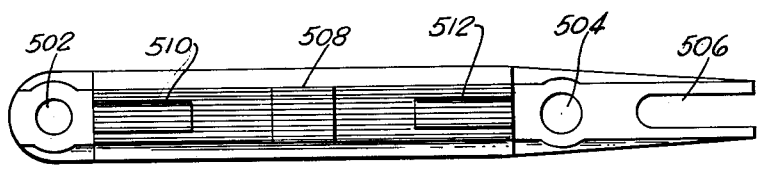
Fig. 5
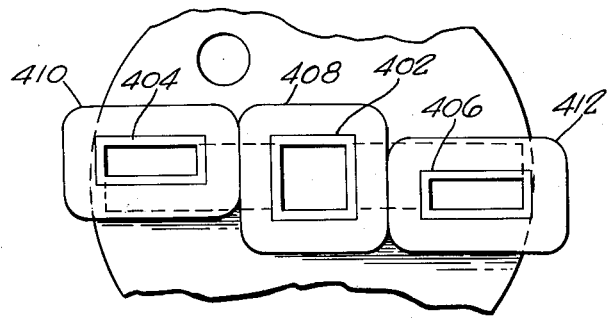
Fig. 4
MORTON FROMER
RUDOLPH F. KEMKA
SAMUEL F. LENNOX
INVENTORS
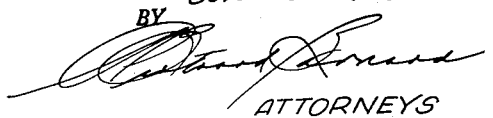
ATTORNEYS Oct. 24, 1961 M. FROMER ET AL 3,005,939
PRECISION ANGULAR INDEXING SERVOSYSTEM
Filed Dec. 8, 1959 5 Sheets-Sheet 5

MORTON FROMER
RUDOLPH F. KEMKA
SAMUEL F. LENNOX
INVENTORS

BY Andrew L. Bain

ATTORNEYS

United States Patent Office

3,005,939
Patented Oct. 24, 1961

1

3,005,939
PRECISION ANGULAR INDEXING
SERVOSYSTEM
Morton Fromer, Maplewood, Rudolph F. Kemka, Hillsdale, and Samuel F. Lennox, Oakland, N.J., assignors to General Precision, Inc., a corporation of Delaware
Filed Dec. 8, 1959, Ser. No. 858,254
12 Claims. (Cl. 318—28)

This invention relates to a precision angular index stand, and more particularly, to a semi-automatic precision angular index stand.

It is often desired to provide an angular index stand which may be used to position a shaft extremely accurately to a plurality of predetermined discrete angular positions. For instance, such an index stand may be used for the calibrating of syncros, resolvers or other such rotary elements and the testing thereof. In this case, it is necessary to measure the ratio of input and output voltages at various accurately known angular displacements between the rotor and stator of the rotary element under test.

In order that such testing and calibration may be accomplished by relatively unskilled personnel, it is desirable that angular positioning of the index stand be automatic, only necessitating the pushing of a button by the operator.

Furthermore, to insure that the extremely high accuracy of the index stand is not degraded with use thereof, it is particularly desirable that the angular position determining elements of the index stand include no wearing parts.

The index stand contemplated by the present invention is capable of positioning a shaft in discrete increments, such as 5°, over a 360° range with an accuracy of 2 seconds of arc. The novel angular positioning determining elements of this index stand include no wearing parts, so that this very high accuracy is not degraded with use.

It is therefore an object of this invention to provide an improved angular index stand.

It is a further object of this invention to provide means for positioning a shaft with an extreme degree of accuracy.

It is a further object of this invention to provide a semi-automatic index stand.

It is a further object of this invention to provide highly precise angular position determining means which incorporate no wearing parts.

One feature of the present invention is the use of photoelectric means for controlling rough angular positioning.

Another feature of the present invention is the use of an improved E bridge having an extremely sharp characteristic for controlling fine positioning.

Figure 2:
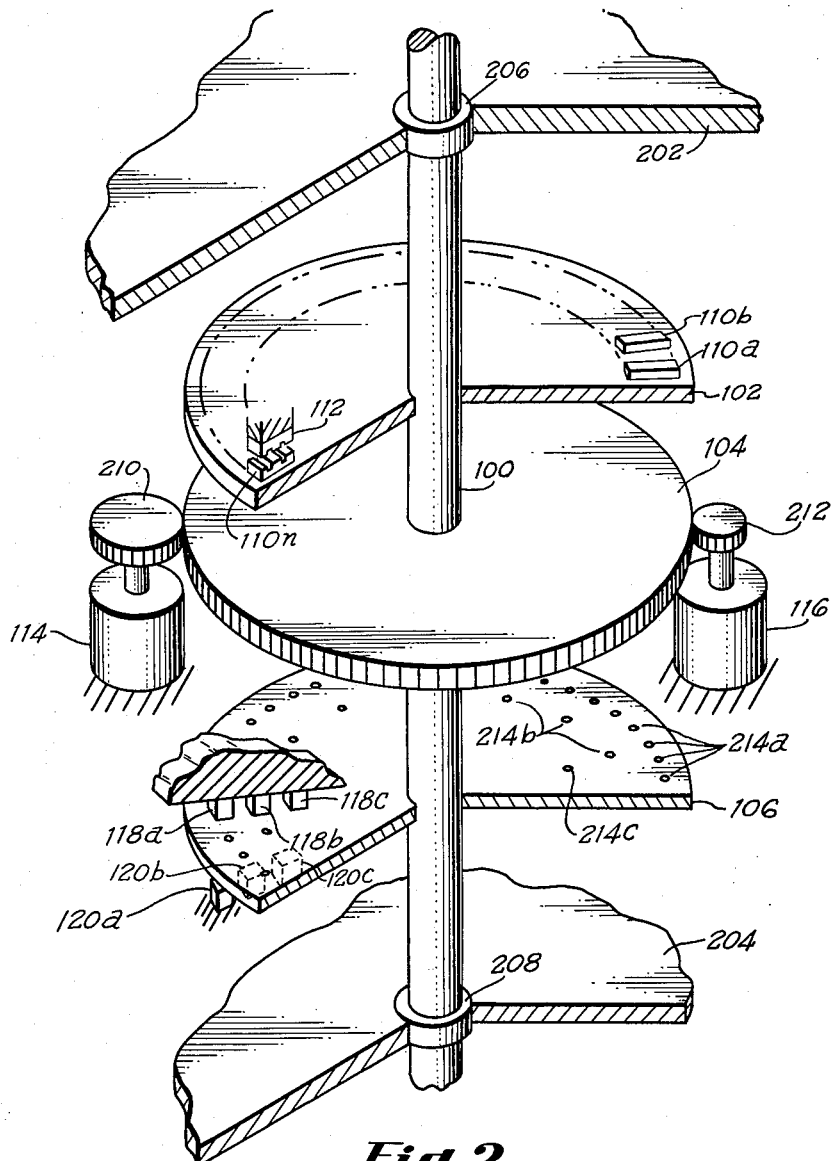
Figure 6:
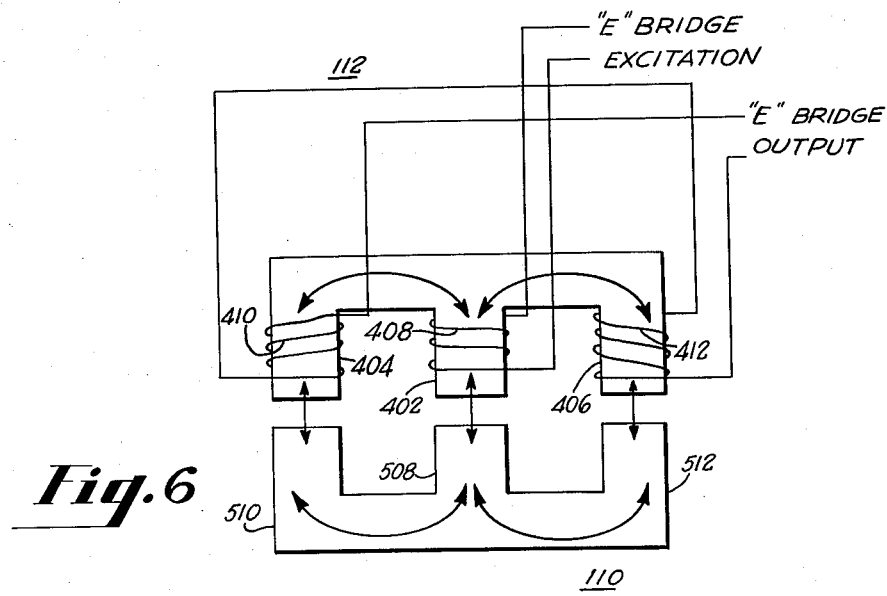
Figure 7:
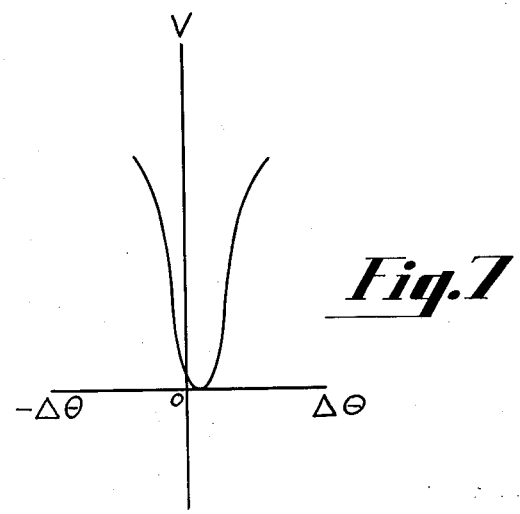

These and other objects, features and advantages of the present invention will become more apparent from the following detailed description thereof taken together with the accompanying drawings, in which:

FIGURE 1 is a block diagram of a preferred embodiment of the invention,

FIGURE 2 is a fragmentary illustration of the index stand, showing the pertinent portions thereof, FIGURE 3 is a schematic circuit diagram of the pushbutton selector and control means of FIGURE 1, FIGURE 4 shows the stator element of the E bridge in detail, FIGURE 5 shows one of the rotor elements of the E bridge in detail, FIGURE 6 shows the electrical and magnetic circuits of the E bridge, and FIGURE 7 shows the characteristic curve of the E bridge.

Referring now to FIGURE 1, the index stand itself

2 comprises a rotatable shaft 100 on which are fixedly mounted E bridge rotor wheel 102, positioning gear 104 and program disc 106. Concentric with shaft 100, but not fixed thereto, is mounting adapter 108.

Mounting adapter 108 includes a table for mounting a syncro under test, which table is independently rotatable through a predetermined angular range and may be locked in any position within this range. The rotor shaft of the syncro under test is fixedly coupled to shaft 100. Since the present invention is not directed to the mounting adapter, a detailed description of the structure of mounting adapter 108 is being omitted.

E bridge rotor wheel 102 has secured thereto 72 rotor elements, such as rotor element 110n, at 5° intervals around the circumference of E bridge rotor wheel 102. Each of the 72 rotor elements comes into cooperative relationship with permanently fixed E bridge stator element 112 during a revolution of wheel 102.

Shaft 100, along with rotor wheel 102 and program disc 106, are rotated by positioning gear 104. Positioning gear 104 is driven by anti-backlash motor 114 and servo motor 116. Anti-backlash motor 114, when operated, applies a small torque to positioning gear 104 always in the same given direction. Servo motor 116 applies a torque to positioning gear 104 which is proportional to the amplitude of the energization thereof and in a direction determined by the phase of the energization thereof. Except for very small amplitudes of energization thereof, the torque produced by servo motor 116 exceeds the torque produced by anti-backlash motor 114.

Program disc 106 is an opaque disc having a first series of spaced holes therein cooperating with light source 118a and photocell 120a, a second series of spaced holes therein cooperating with light source 118b and photocell 120b, and a single hole therein cooperating with light source 118c and photocell 120c.

The index stand is selectively operated and controlled by pushbutton position selector and control means 122, and servo motor 116 is energized through amplifier 124.

Referring now to FIGURE 2, which shows the pertinent portions of the index stand in somewhat greater detail, shaft 100 is rotatably mounted in housing members 202 and 204 by means of bearings 206 and 208, respectively. Bearings 206 and 208 should be preferably tapered roller bearings in order to maintain shaft 100 axially rigid.

Detachably secured to E bridge rotor wheel 102, spaced at 5° intervals, are 72 E bridge rotor elements, such as elements 110a, 110b, and 110n.

A rotor element 110, which is shown in detail in FIGURE 5, includes mounting holes 502 and 504 and mounting slot 506. For reasons to be described hereinafter, the exact position of each of the rotor elements is highly critical. Therefore, in mounting a rotor element, the rotor element is maintained rotatable about the center of mounting hole 502 and an eccentric head screw is inserted in mounting hole 504, so that the exact position of the rotor element may be adjusted to the proper position. Screws through mounting hole 502 and mounting slot 506 are then tightened to maintain the rotor element in its adjusted position. In this manner, the extreme tolerance machining which would be necessary if the rotor elements were made integral with wheel 102 is eliminated.

As shown in FIGURE 2, positioning gear 104 meshes with drive gear 210 of anti-backlash motor 114 and with drive gear 212 of servo motor 116.

Program disc 106, which is opaque, includes a first series of 72 holes, 214a, located at 5° intervals, in cooperative relationship with light source 120a and photocell 120a; a second series of 24 holes 214b, located at 15° intervals, in cooperative relationship with light source 118b and photo-cell 120b, and a single hole 214c, manifesting 0° reference, in cooperative relationship with light source 118c and photo-cell 120c. The angular positions of all the holes of program disc 106 and the rotor elements 110 are all with respect to this 0° reference. The diameter of each of the holes is quite small, approximately 0.030 inch, for example.

Referring now to FIGURE 3, there is included in pushbutton position selector and control means 122, 0° pushbutton 302, 5° pushbutton 304, and 15° pushbutton 306. Associated with 0° pushbutton 302 is start relay 308 having normally open contacts 308a, 308c, 308d, and 308f, and normally closed contacts 308b, 308e, and 308g. Associated with 5° pushbutton 304 is start relay 310 having normally open contacts 310a, 310c, 310d, and 310f, and normally closed contacts 310b, 310e, and 310g. Associated with 15° pushbutton 306 is start relay 312 having normally open contacts 312a, 312c, 312d, and 312f, and normally closed contacts 312b, 312e, and 312g.

Also included is slow-operate relay 314 having normally open contacts 314a, disconnect relay 316 having normally closed contacts 316a, reversing switch 318 and Thyratron tube circuit 320.

Control means 122 also includes means for applying 60 cycle A.C. power to the light source, 400 cycle A.C. power to the E bridge and anti-backlash motor as well as reversing switch 318, and D.C. power to the relays and Thyratron tube circuit 320. A switch, not shown, may be included for turning these power sources off or on.

Glow tube circuit 320 includes Thyratron tube 322, input resistance 324, input capacitance 326, cathode resistance 328 and bias resistances 330 and 332.

Low pass filter 334 is inserted in the input leads from the E bridge output.

Referring now to FIGURE 4, which shows a bottom view of the E bridge stator, it will be seen that the central leg 402 of the E bridge stator 112 is square in cross-section, and that the end legs 404 and 406 thereof have a length equal to that of central leg 402 and a width equal to one-half of central leg 402. Furthermore, as shown end legs 404 and 406 are offset on opposite sides of central leg 402 with the top edge of end leg 404 in line with the top edge of central leg 402 and the bottom edge of end leg 406 in line with the bottom edge of central leg 402.

Surrounding central leg 402 is excitation winding 408 and surrounding end legs 404 and 406, respectively, are output windings 410 and 412, respectively.

Returning again to FIGURE 5, which shows a detail of the top of one E bridge rotor element 110, there is included central leg 508, having a square cross-section, and end legs 510 and 512 each having one-half the width of central leg 508. However, as opposed to end legs 404 and 406 of stator element 112, end legs 510 and 512 of a rotor element 110 are not offset, but are symetrically disposed with respect to central leg 508.

Referring now to FIGURE 6, which shows the electrical and magnetic circuits of E bridge stator element 112 in cooperative relationship with an E bridge rotor element 110, excitation winding 408 surrounds central leg 402 of stator element 402, output winding 410 surrounds end leg 404 of stator element 402, and output winding 412 surrounds end leg 406 of stator element 402. As shown, output windings 410 and 412 are wound in opposite directions and are connected in series with each other. The arrows show the magnetic circuit between central legs 402 and 508 and end legs 404 and 510 and end legs 406 and 512, respectively.

It will be seen that the amplitude of the E bridge output will be the difference between the amplitudes of the voltage induced in output winding 410 and the voltage induced in output winding 412. The amplitude of the voltage induced in output winding 410 depends upon the reluctance of the magnetic circuit therethrough and the amplitude of the output voltage induced in output winding 412 also depends upon the reluctance of the magnetic circuit therethrough. Both the absolute and relative values of these respective reluctances depends upon the exact angular positioning between a rotor element 110 and stator element 112. Because of the relative sizes, shapes and orientation of legs 402, 404 and 406 of stator element 112, described above, the characteristic curve, shown in FIGURE 7, of the output voltage from the E bridge vs. angular deviation between a rotor element 110 and stator element 112 is extremely sharp.

Considering now the operation of the device, it will be seen from FIGURES 1 and 3 that 60 cycle A.C. excitation is applied to light sources 118a, 118b and 118c, causing these light sources to emit light beams. Also 400 cycle excitation is applied to the winding of the central leg of E bridge stator element 112 and is also applied to anti-backlash motor 114. In response thereto, anti-backlash motor 114 applies a small torque to positioning gear 104 in a given direction, which for the purposes of this discussion will be assumed to be in a counterclockwise direction.

Assume that originally the index stand is in its zero degree reference position and that 5° pushbutton 304 is manually momentarily closed. In response to the closure of 5° pushbutton 304, operating ground for start relay 310 is applied thereto through normally closed contacts 316a, 312b, 310b, and 308b and the closed contacts of 5° pushbutton 304.

Therefore, start relay 310 operates to effect the closure of normally open contacts 310a, 310c, 310d and 310f, and the opening of normally closed contacts 310b, 310e and 310g.

The closure of contacts 310a and the opening of contacts 310b, which are make-before-break contacts, transfers the operating ground directly to start relay 310, holding start relay 310 operated and rendering all of the pushbuttons ineffective so long as relay 310 remains operated. Thus, only one of start relays 308, 310, and 312 may be operated at a time.

The closure of contacts 310c applies operating ground to slow operate relay 314. However, relay 314 does not operate immediately due to its slow operate characteristics.

The closure of contacts 310d applies a resistance ground to 5° photocell 120a from ground through resistance 330, normally closed contacts 308e, operated contacts 310d and the 5° conductor to the photocell 120a. However, the circuit path for photocell 120 remains incomplete because the common lead from the photocells remains open at open contacts 314a.

The opening of contacts 310e removes a bias potential from the control electrode of Thyratron tube 322, which will be described in greater detail hereinafter.

The opening of contacts 310g and the closure of contacts 310f transfers the input to servomotor 116 through amplifier 124 from the output of the E bridge to the 400 cycle source through reversing switch 318. The phase of the 400 cycle energization, and hence the direction of the torque applied by servo motor 116 to shaft 100 through positioning gear 104, is determined by the switch position of reversing switch 318. For the purposes of the following discussion it will be assumed that reversing switch 318 is in its left position, and that in this position the torque applied by servo motor 116 is in a counter clockwise direction.

Thus, both servo motor 116, which applies a relatively large torque, and anti-backlash motor 114, which applies a relatively small torque, apply torques in a counterclockwise direction. Therefore, shaft 100 along with E bridge rotor wheel 102 and program disc 106 commences to rotate from its zero degree reference position in a counterclockwise direction at an angular velocity proportional to the sum of the torques from servo motor 116 and anti-backlash motor 114.

While shaft 100 remained in its zero degree reference position, the holes manifesting zero degrees of the first series of holes, the second series of holes and the single hole manifesting zero degrees of program disc 106 were respectively, in cooperative relationship with photocells 120a, 120b and 120c, respectively. However, at this time photocells 120a, 120b and 120c were unoperated, although a circuit path for photocell 120 was prepared, but not completed, by the closure of contacts 310d, as previously described.

When program disc 106 has rotated a small distance, so that the holes are no longer in cooperative relationship with the photocells, slow operate relay 314 finally operates, closing normally open contacts 314a thereof, thereby completing the circuit path only for photocell 120a. Now, however, an opaque portion of program disc 106 is between light source 118a and photocell 120a, so that photocell 120a remains quiescent.

When shaft 100 and program disc 106 have rotated through approximately 5°, the next hole in the first series of holes comes into cooperative relationship with photocell 120, light from light source 118a reaches photocell 120a, and photocell 120a conducts. This, in turn, causes the potential on the control electrode of Thyratron tube 322 to become more positive, and Thyratron tube 322 fires, conducting a relatively heavy current through disconnect relay 316 and cathode resistance 328.

The conduction current through cathode resistance 328 raises the potential of the cathode of Thyratron tube 322 to the point where the anode-cathode voltage across Thyratron tube 322 is insufficient without the relatively positive potential on the control electrode thereof to maintain Thyratron tube 322 conducting.

The conduction current through disconnect relay 316 causes relay 316 to operate, thereby opening normally closed contacts 316a thereof. The opening of contacts 316a breaks the previously described operating ground holding start relay 310 operated. Therefore, start relay 310 restores.

In response to the restoration of relay 310, contacts 310c reopen, de-energizing relay 314, which restores to open contacts 314a thereof.

Furthermore, contacts 310d are reopened, breaking the previously described circuit path for photocell 120a, and contacts 310e are reclosed, applying ground to the control electrode of Thyratron tube 322 through resistance 330, normally closed contacts 308e, 310e, 312e and resistance 332. Breaking the circuit path for photocell 120a removes the relatively high positive potential on the control electrode of Thyratron tube 322, and resistances 330, 332, 324, and 328 form a voltage divider for placing a relatively low bias potential on the control electrode of Thyratron tube 322. Since, as previously described, the anode-cathode potential is too low, due to the conduction drop across cathode resistance 328, to maintain Thyratron tube 322 conducting without a relatively high positive potential on the control electrode thereof, Thyratron tube 322 is now deactivated. Therefore, disconnect relay 316 restores and contacts 316a thereof reclose.

The reopening of contacts 310f and the reclosing of contacts 310g transfers the input to servo motor 116 through amplifier 124 from the 400 cycle A.C. source to the output from the E bridge, which is applied through low pass filter 334.

Since servo motor 116 has been assumed to have applied a counter-clockwise torque, at the moment the E bridge output is applied to servo motor 116, $\Delta\theta$ in FIGURE 7 will be to the right of the null point of the characteristic of the E bridge. In this case, the phase of the E bridge output will be such as to cause servo motor 116 to continue to apply a counter-clockwise torque. Therefore, shaft 100 will be rotated in a counter-clockwise direction, causing $\Delta\theta$ to move to the left in FIGURE 7 toward the null point on the characteristic curve, the output V from the E bridge thereby decreasing toward zero. At the null point, servo motor 116 applies zero torque to shaft 100. However, anti-backlash motor 114 still applies a small counter-clockwise torque to shaft 100, so that shaft 100 continues to rotate in a counter-clockwise direction beyond the null point of the E bridge. This results in reversal in the phase of the output of the E bridge, causing servo motor 116 to now apply a clockwise torque to shaft 100 which rises very rapidly due to the sharp characteristic curve of FIGURE 7. When the clockwise torque of servo motor 116 is exactly equal and opposite to the counter-clockwise torque of anti-backlash motor 114, shaft 100 comes to rest.

The purpose of inserting low pass filter 334 in the output of the E bridge is in order to filter out harmonics, particularly the second and other even harmonics. Since the output from the E bridge is obtained from output winding 410 connected in series opposition with output winding 412, as shown in FIGURE 6, and even harmonics are 180° out of phase with the fundamental, the amplitude of the second harmonic appearing in the output of the E bridge reaches a maximum when the fundamental is at null. It is, therefore, necessary to filter out the harmonics in order not to destroy the extreme accuracy of the E bridge.

If now, the operator should press 5° pushbutton 304 again, the operation will be repeated and the index will move an additional 5°.

If the operator should press either 15° pushbutton 306 or 0° pushbutton 302, the operation will be identical in all respects except that photocell 120b or 120c, as the case may be, will be rendered operated, rather than photocell 120a. Therefore, the 400 cycle A.C. energization of servo motor 116 will drive shaft 100 either to the next hole in cooperative relationship with 15° photocell 120b or to the single 0° reference hole, as the case may be, before the output of the E bridge takes control.

If reversing switch 318 is switched to its right position, the 400 cycle A.C. energization of servo motor 116 will have a phase such that servo motor 116 applies a clockwise torque. In this case, shaft 100 has a total clockwise torque applied thereto which is the difference between the relatively large clockwise torque of servo motor 116 and the relatively small counter-clockwise torque of anti-backlash motor 114. It will be seen that in this situation, at the moment the E bridge assumes control, $\Delta\theta$ of FIGURE 7 is to the left, and then moves toward the right. Shaft 100, therefore, comes to rest at the same realtive point of FIGURE 7 as previously described, i.e., where the torques applied by servo motor 116 and anti-backlash motor 114 are equal and opposite. Thus, the presence of anti-backlash motor 114 ensures that the accuracy of positioning is not affected by a dead space in the region of the null, due to the inherent friction in servo motor 116, and that shaft 100 will come to rest at the same point regardless of whether it approaches this point from a clockwise or counter-clockwise direction.

As mentioned earlier, the present index stand operates with an error of no more than two seconds of arc in positioning shaft 100 to any particular one of the 72 discrete positions. This extremely high degree of accuracy is a result of the initial positioning of each of the 72 rotor elements 110 on E bridge rotor wheel 102 and the relative size, shape and orientation of legs 402, 404 and 406 of stator element 112, and legs 508, 510 and 512 of the rotor elements 110.

Considering now the manner in which each of the 72 rotor elements 110 are initially positioned on E bridge rotor wheel 102, a precise angle measuring standard which can measure angles accurately to less than a second of arc, is coupled to shaft 110. Then 0° pushbutton 302 is pressed to rotate shaft 100 to its zero degree reference position, and the angular reading on the standard is noted. The 5° pushbutton 304 is then pressed, and when shaft 100 comes to rest, the angular reading on the standard is again noted. The difference between the two readings should be exactly 5°. If it is not, the eccentric screw through hole 504 is adjusted to slightly shift the position of the rotor element 110 manifesting 5° in a direction to minimize the error. This entire process is repeated again and again, in cut and try fashion, until the error is eliminated. Then this rotor element is permanently held in its proper position by tightening the screws through hole 502 and slot 506. In a similar manner, each of the 70 other rotor elements is adjusted to its respective proper position.

It will be seen that the relative size, shape and orientation of legs 508, 510, and 512 of a rotor element 110 and legs 402, 404 and 406 of stator element 112, provides a large change in coupling area between rotor and stator elements in response to a small relative angular shift between these elements. Furthermore, it will be seen that the change in coupling area between legs 404 and 510 is in one direction and the change in coupling area between legs 406 and 512 is in the opposite direction, i.e., when the coupling area between legs 404 and 510 increases, the coupling area between legs 406 and 512 decreases, and vice versa. This results in providing the very sharp characteristic curve of FIGURE 7. Because this characteristic curve is so sharp, the angular resolution of the disclosed E bridge is very high, and hence the error in angular positioning is very low, no more than two second of arc, as stated previously.

Although only a preferred embodiment of the invention has been described in detail herein, it is not intended that the invention be restricted thereto, but that it be limited only by the true spirit and scope of the appended claims.

We claim:

1. A precision angular index stand for accurately positioning a shaft to any one of a discrete plurality of angular indices, said index stand including E bridge means and rough positioning means associated with each of said angular indices, torque means for applying a torque to said shaft of a magnitude determined by the amplitude of an input signal applied to said torque means and in a direction determined by the phase of said input signal, means for applying a constant amplitude signal of a given phase as said input signals to said torque means, whereby said shaft is caused to rotate in a given direction, and control means responsive to said rough positioning means for transferring said input signal from said constant amplitude signal to the output from said E bridge means in response to said shaft being rotated to a point in the vicinity of one of said angular indices.

2. The index stand defined in claim 1, wherein said E bridge means comprises a wheel mounted to said shaft on which there are disposed at predetermined angular intervals individual E bridge rotor elements, and a fixed E bridge stator element with which each of said rotor elements comes into cooperative relationship as said shaft rotates.

3. The index stand defined in claim 2, wherein each of said rotor elements and said stator element includes a central leg and two end legs, said central legs being of rectangular cross-section and having a given width, said end legs being of rectangular cross-section and having a width equal to one-half that of said central legs, said end legs of each of said rotor elements having a first orientation with respect to said central leg thereof and said end legs of said stator element having a second orientation with respect to said central leg thereof, in one of said first and second orientations the bisector of the width of said central leg is also the bisector of the width of said end legs and in the other of said first and second orientations the bisector of the width of one end leg is offset one-half the width thereof on one side of the bisector of the width of said central leg and the bisector of the width of the other end leg is offset one-half the width thereof on the other side of the bisector of the width of said central leg.

4. The index stand defined in claim 3, wherein said stator element includes an energization winding wound around each end leg thereof, and means for connecting said output windings in series opposition for obtaining the output of the E bridge.

5. The index stand defined in claim 4, further including a low pass filter coupled to the output of said E bridge.

6. The index stand defined in claim 1, wherein said rough positioning means comprises an opaque program disc mounted to said shaft, a series of small holes through said opaque disc spaced at predetermined angular intervals, a fixed light source located on one side of said disc with which each of said holes comes into cooperative relationship as said shaft rotates, and a photocell located on the other side of said disc which is oriented to come into cooperative relationship with said light source each time one of said holes passes therebetween.

7. The index stand defined in claim 6, wherein said control means includes means operated in response to light from said light source passing through a hole and impinging on said photocell for transferring said input signal from said constant amplitude signal to the output from said E bridge means.

8. The index stand defined in claim 6, wherein said disc includes a plurality of series of small holes, each of said series of spaced holes being spaced at different predetermined angular intervals, and respective light sources and photocells on opposite sides of said disc in cooperative relationship with each respective series of spaced holes, and wherein said control means includes means for selectively rendering operative any one of said photocells, and means responsive to light from said light source impinging on said photocell which has been rendered operative through a hole of that series of holes which is in cooperative relationship with the respective photocell which has been rendered operative for transferring said input signal from said constant amplitude signal to the output from said E bridge means.

9. The index stand defined in claim 8, wherein said holes of a first series are spaced at regular angular intervals over a 360° range with respect to a zero degree reference position, wherein the angular interval between holes of each other series is a different multiple of the angular interval between said first series of holes and is measured from the same zero degree reference position, and wherein said E bridge means includes a wheel mounted to said shaft on which there are disposed at angular intervals corresponding to the angular intervals between said first series of holes individual E bridge rotor elements, and a fixed E bridge stator element with which each of said rotor elements comes into cooperative relationship as said shaft rotates.

10. The index stand defined in claim 1, further including second torque means for applying a constant second torque in a given direction to said shaft, said torque being relatively low compared to the torque provided by said first mentioned torque means except when the input signal to said first mentioned torque means is the output from said E bridge means which is in the immediate vicinity of the null thereof.

11. The index stand defined in claim 10, further including means for reversing the phase of the constant amplitude signal applied as the input signal to said first mentioned torque means.

12. The index stand defined in claim 11, wherein said first mentioned torque means is a servo motor and said second torque means is an anti-backlash motor.

References Cited in the file of this patent

UNITED STATES PATENTS

| | | |
|---|---|---|
| 2,415,819 | Halpert et al. | Feb. 18, 1947 |
| 2,484,022 | Esval | Oct. 11, 1949 |
| 2,862,193 | Fryklund | Nov. 25, 1958 |